(12) United States Patent
Phillips

(10) Patent No.: US 8,286,862 B2
(45) Date of Patent: Oct. 16, 2012

(54) METHODS AND APPARATUS FOR USE IN ASSOCIATION WITH SECURITY PARAMETER

(75) Inventor: Simon Phillips, York (GB)

(73) Assignee: MasterCard International, Inc., Purchase, NY (US)

( * ) Notice: Subject to any disclaimer, the term of this patent is extended or adjusted under 35 U.S.C. 154(b) by 619 days.

(21) Appl. No.: 11/966,083

(22) Filed: Dec. 28, 2007

(65) Prior Publication Data

US 2009/0166407 A1    Jul. 2, 2009

(51) Int. Cl.
*G06K 5/00* (2006.01)

(52) U.S. Cl. ........................................................ 235/380
(58) Field of Classification Search .................. 235/380; 455/435.1; 340/5.31
See application file for complete search history.

(56) References Cited

U.S. PATENT DOCUMENTS

| | | | |
|---|---|---|---|
| 3,044,606 A | 7/1962 | Frosh | |
| 4,439,941 A | 4/1984 | Halperin | |
| 5,276,311 A | 1/1994 | Hennige | |
| 5,585,787 A | 12/1996 | Wallerstein | |
| 5,898,783 A * | 4/1999 | Rohrbach | 340/5.31 |
| 5,955,961 A | 9/1999 | Wallerstein | |
| 6,224,254 B1 | 5/2001 | Hayek et al. | |
| 6,272,009 B1 | 8/2001 | Buican et al. | |
| 6,315,195 B1 | 11/2001 | Ramachandran | |
| 6,353,811 B1 | 3/2002 | Weissman | |
| 6,561,432 B1 | 5/2003 | Vedder et al. | |
| 6,631,849 B2 | 10/2003 | Blossom | |
| 6,685,097 B1 | 2/2004 | Housse | |
| 6,715,679 B1 | 4/2004 | Infosino | |
| 6,764,005 B2 | 7/2004 | Cooper | |
| 6,766,952 B2 | 7/2004 | Luu | |
| 6,863,220 B2 | 3/2005 | Selker | |

(Continued)

FOREIGN PATENT DOCUMENTS

WO   9833193 A1   7/1998

(Continued)

OTHER PUBLICATIONS

International Standard, "Identification cards—Physical Characteristics", ISO/IEC 7810, Third Edition, Nov. 1, 2003, 18pgs.

(Continued)

*Primary Examiner* — Thien M Le
*Assistant Examiner* — Sonji Johnson
(74) *Attorney, Agent, or Firm* — Buckley, Maschoff & Talwalkar LLC

(57) ABSTRACT

In accordance with some embodiments, a method comprises transmitting at least one signal, via a wireless interface, from an identification token issued to an account holder to a communication device issued to the account holder; receiving at least one signal from the communication device via the wireless interface; and resetting a security parameter in the identification token in response at least in part to receiving the at least one signal from the communication device. In accordance with some embodiments, apparatus comprises an identification token issued to an account holder, the identification token to transmit at least one signal, via a wireless interface, to a communication device issued to the account holder, to receive at least one signal from the communication device via the wireless interface, and to reset a security parameter in the identification token in response at least in part to receiving the at least one signal from the communication device.

19 Claims, 12 Drawing Sheets

U.S. PATENT DOCUMENTS

| | | | |
|---|---|---|---|
| 6,957,771 B2 * | 10/2005 | Norris, Jr. | 235/382 |
| 6,978,940 B2 | 12/2005 | Luu | |
| 7,012,504 B2 | 3/2006 | Tuttle | |
| D522,052 S | 5/2006 | Lubking | |
| 7,114,659 B2 | 10/2006 | Harari et al. | |
| 7,143,419 B2 | 11/2006 | Fischer et al. | |
| 7,204,412 B2 | 4/2007 | Foss, Jr. | |
| 7,264,172 B2 | 9/2007 | Amiot et al. | |
| 7,641,111 B2 * | 1/2010 | Adams et al. | 235/380 |
| 2002/0154607 A1 | 10/2002 | Forstadius et al. | |
| 2003/0132301 A1 | 7/2003 | Selker | |
| 2003/0226042 A1 | 12/2003 | Fukushima | |
| 2004/0030601 A1 | 2/2004 | Pond et al. | |
| 2004/0049451 A1 | 3/2004 | Berardi et al. | |
| 2004/0124248 A1 | 7/2004 | Selker | |
| 2004/0180657 A1 * | 9/2004 | Yaqub et al. | 455/435.1 |
| 2004/0195305 A1 | 10/2004 | Dotson | |
| 2004/0195340 A1 | 10/2004 | Lubking | |
| 2004/0223305 A1 | 11/2004 | Amoit et al. | |
| 2005/0033688 A1 | 2/2005 | Peart et al. | |
| 2005/0220046 A1 * | 10/2005 | Falck et al. | 370/315 |
| 2005/0258245 A1 | 11/2005 | Bates | |
| 2006/0137464 A1 | 6/2006 | Baudendistel | |
| 2006/0283960 A1 | 12/2006 | Top | |
| 2007/0123305 A1 * | 5/2007 | Chen et al. | 455/558 |
| 2007/0152035 A1 * | 7/2007 | Adams et al. | 235/380 |
| 2007/0176898 A1 | 8/2007 | Suh | |
| 2007/0262134 A1 | 11/2007 | Humphrey et al. | |
| 2007/0278317 A1 | 12/2007 | Onishi et al. | |
| 2008/0011859 A1 | 1/2008 | Phillips | |
| 2008/0035740 A1 | 2/2008 | Tanner | |
| 2008/0054078 A1 | 3/2008 | Tanner | |
| 2008/0061148 A1 | 3/2008 | Tanner | |
| 2008/0061149 A1 | 3/2008 | Tanner | |
| 2008/0061150 A1 | 3/2008 | Phillips | |
| 2008/0061151 A1 | 3/2008 | Phillips | |
| 2008/0121707 A1 | 5/2008 | Phillips et al. | |
| 2008/0165006 A1 | 7/2008 | Phillips | |
| 2009/0065575 A1 | 3/2009 | Phillips et al. | |
| 2009/0065587 A1 | 3/2009 | Phillips | |
| 2009/0108060 A1 | 4/2009 | Phillips et al. | |
| 2009/0166407 A1 | 7/2009 | Phillips | |
| 2009/0166408 A1 | 7/2009 | Phillips | |
| 2009/0166428 A1 | 7/2009 | Phillips et al. | |
| 2010/0005313 A1 * | 1/2010 | Dai | 713/185 |

FOREIGN PATENT DOCUMENTS

| | | | |
|---|---|---|---|
| WO | 9938173 A1 | 7/1999 | |
| WO | 0079546 A1 | 12/2000 | |

OTHER PUBLICATIONS

"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.

Leslie Berlin, Prototype, "Cellphones as Credit Cards? Americans Must Wait", Published Jan. 24, 2009, [Retrieved Jan. 26, 2009]. Retrieved from URL:Http://www.nytimes.com/2009/01/25/business/25proto.html?_r=1&em, 3pgs.

"PCT Notification of Transmittal to the International Search Report or the Declaration", dated Mar. 17, 2008 for PCT/US07/75707, 2pgs.

Jay MacDonald, "Calling Dick Tracy: Credit card watches debut", Mar. 24, 2009, Credit Cards.com, 2pgs.

"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.

"JCB pilots contactless payments", Apr. 1, 2004, [Retrieved Mar. 31, 2009]. Retrieved from URL: http://www.finextra.com/fullstory.asp?id=11549, 2pgs.

"JCB delivers contactless Offica service over Casio wrist watch", Jun. 14, 2004, [Retrieved Mar. 31, 2009]. Retrieved from URL: http://www.finextra.com/fullstory.asp?id=11994, 2pgs.

"MasterCard launches OneSmart Paypass", Nov. 2, 2004, [Retrieved Mar. 31, 2009]. Retrieved from URL: http://www.finextra.com/fullstory.asp?id=12788, 2pgs.

"Visa launches contactless payments system in US", Feb. 25, 2005, [Retrieved Mar. 31, 2009]. Retrieved from URL: http://www.finextra.com/fullstory.asp?id=13291, 2pgs.

"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.

Ian Rowley (in Tokyo), "$5,000? Put It On My Cell", Jun. 6, 2005, Asian Business, Business Week, [Retrieved Mar. 31, 2009]. Retrieved from URL: http://www.businessweek.com/print/magazine/content/05_23/b3936060.htm?chan=gl, 2pgs.

"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.

"Turkey gets wristwatch with built-in credit card", May 11, 2007, [Retrieved Mar. 30, 2009]. Retrieved from URL: http://www.wristdreams.com/archives/2007/05/turkey_gets_wri.html, 4pgs.

"Wristwatch Equipped With a Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.

"Wristwatch With Built-In Credit Card", Saturday, May 26, 2007, [Retrieved Mar. 30, 2009]. Retrieved from URL: http://www.funniestgadgets.com/2007/05126/wristwatch-with-built-in-credit-card/, 3pgs.

Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL: http://www.paleofuture.com/blog/200719/14/credit-card-rings-1964.html, 5pgs.

"Altair unveils pre-paid contactless PayPass wrist watch", Jun. 27, 2008, [Retrieved Mar. 31, 2009]. Retrieved from URL: http://www.finextra.com/fullstory.asp?id=18654, 3pgs.

* cited by examiner

METHODS AND APPARATUS FOR USE IN ASSOCIATION WITH SECURITY PARAMETER

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) terminal. The wireless interface often includes a radio frequency identification integrated circuit (RFID IC) and an antenna to receive a power signal from and/or communicate with the POS terminal.

Some proximity payment devices include an EMV risk parameter that is used to help reduce and/or limit fraud and/or bad debt. The EMV risk parameter is usually incremented or decremented each time the proximity payment device is used in a purchase transaction. The proximity payment device may be usable only until the EMV risk parameter reaches a predetermined value and/or until a predetermined amount has been spent. Thereafter, the EMV risk parameter may need to be reset if the proximity payment device is to be usable in further purchase transactions.

One issue associated with the above method is how to reset the EMV risk parameter during periods of time in which the risk of fraud and/or bad debt is low, e.g., when the proximity payment device is not lost and the account is in good standing. Some systems reset the EMV risk parameter after the proximity payment device has been used in a predetermined number of transactions. In some systems, this takes place the next time that the proximity payment device is presented for a purchase transaction.

The amount of time needed to reset the EMV risk parameter is sometimes twenty to thirty seconds, which may be considerably longer than the amount of time needed for the transaction itself. If the proximity payment device has a card shape and contact terminals, the proximity payment device may be inserted into a card reader with contacts that make contact with the terminals on the card. However, some proximity payment devices do not have a card shape and thus may not be insertable into such a reader.

DETAILED DESCRIPTION

Figure 1:
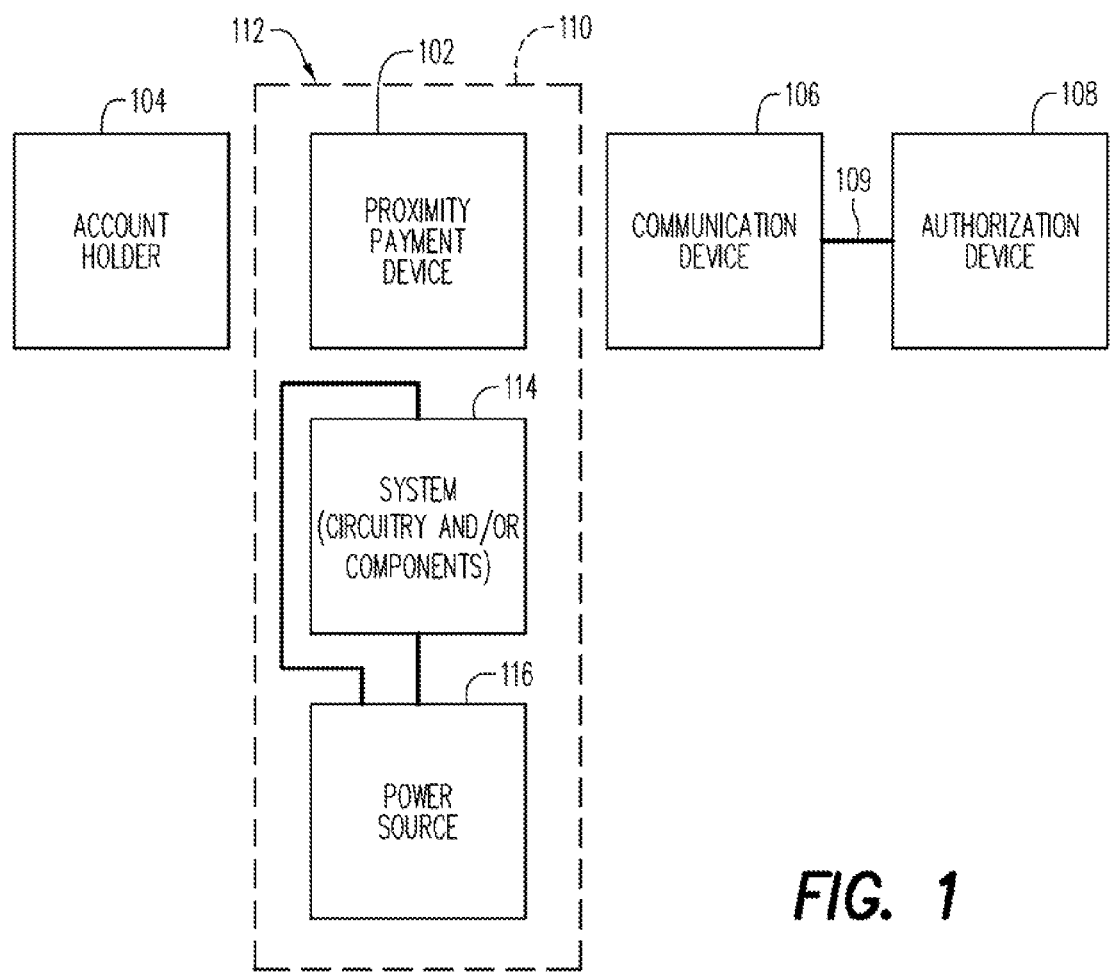
FIG. 1 is a schematic block diagram of a system, according to some embodiments.

FIG. 1 is a schematic block diagram of a system 100 to reset an EMV risk parameter and/or other security parameter(s) stored in a proximity payment device issued to an account holder, in accordance with some embodiments.

Referring to FIG. 1, the system 100 includes a proximity payment device 102 issued to an account holder 104, a communication device 106 issued to the account holder 104 and an authorization device 108. The communication device 104 and the authorization device 108 are coupled by a communication link 109.

The proximity payment device 102 may include an EMV risk parameter and/or other security parameter(s). If the proximity payment device includes an EMV risk parameter, such parameter may be incremented, decremented and/or changed in some other way each time the proximity payment device is used in a purchase transaction. The proximity payment device may be usable only until the EMV risk parameter reaches a predetermined value and/or until a predetermined amount has been spent. Thereafter, the EMV risk parameter may need to be reset if the proximity payment device is to be usable in further purchase transactions. In accordance with some embodiments, an EMV risk parameter and/or other security parameter may be reset to increase the number of transactions in which the proximity payment device may be used.

The proximity payment device 102 may have any configuration. In some embodiments, the proximity payment device 102 is supported by a case and/or other type of body. Such case and/or other type of body is referred to herein as body 110. Unless stated otherwise, the term "supported by" means partially and/or entirely disposed on, disposed in, mounted on, mounted in, installed on, installed in, contained in and/or embedded in.

In some embodiments, body 110 comprises a body of a key fob, a wristwatch, a music player, a video player, a PDA and/or any other portable device 112. In such embodiments, the proximity payment device 102 may be referred to as a proximity payment system 102 of the device 112. The device 112 may further comprise a system 114 to perform one or more functions of the device 112. If the device 112 comprises a wristwatch, the system 114 may comprise circuitry and/or components to perform one or more functions of the wristwatch. If the device 112 comprises a music player, the system 114 may comprise circuitry and/or components to play music. If the device 100 comprises a video player, the system 114 may comprise circuitry and/or components to play video (with or without associated audio). If the device 100 comprises a PDA, the system 114 may comprise circuitry and/or components to perform one or more functions of the PDA. Although the system 104 is shown separate from the proximity payment system 102, in some embodiments, the proximity payment system 102 and the system 114 may share one or more circuits and/or components.

The device 112 may further include a power source 116. The power source 116 may be coupled (directly and/or indirectly) and/or supply power (directly and/or indirectly) to the proximity payment system 102 and/or the system 114. In some embodiments, the power source 116 comprises a battery. If the device 112 comprises a wristwatch, a music player, a video player, a PDA and/or any other portable device 112, the power source 116 may power the key fob, respectively.

The communication device 104 may comprise any type of communication device. As further described hereinafter, in some embodiments, the communication device 106 comprises a cell phone, a computer and/or a dock.

In accordance with some embodiments, the authorization device 108 may comprise any type of device capable of providing an authorization to reset the EMV risk parameter and/or other security parameter(s) stored in the proximity payment device 102.

As stated above, the communication device 104 and the authorization device 108 are coupled by a communication link 109. Unless stated otherwise, a communication link may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

Figure 2:
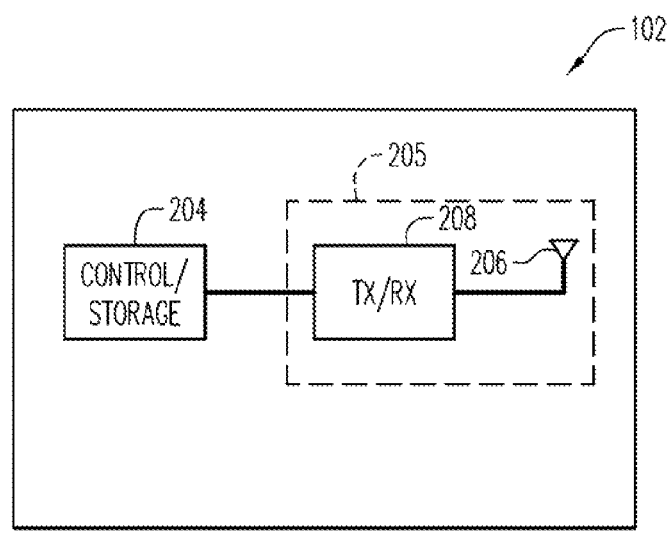
FIG. 2 is a schematic block diagram of a proximity payment device, according to some embodiments.

FIG. 2 is a schematic block diagram of the proximity payment device 102, according to some embodiments. Referring to FIG. 2, in some embodiments, the proximity payment device 102 includes control/storage circuitry 204 and a wireless communication interface 205.

The control/storage circuitry 204 is operative to store a payment account number and/or other information to be transmitted to a POS terminal. In some embodiments, the control/storage circuitry 204 may comprise a simple memory device capable only of responding to a pre-defined set of commands. In some other embodiments, the control/storage circuitry 204 may comprise a secure microcontroller capable of executing a pre-defined program.

The wireless communication interface 205 allows the proximity payment device 102 to transmit and/or receive signals. The signals transmitted by the wireless communication interface 205 may include a payment account number and/or other information stored in the control/storage circuitry 204. The signals received by the wireless communication interface may include an interrogation, a power signal and/or other signals.

In some embodiments, the wireless communication interface 205 is configured to allow the proximity payment device 102 to operate in accordance with the above-mentioned "PayPass" standard.

In some embodiments, wireless communication interface 205 comprises an antenna 206 and transmit/receive circuitry 208. The antenna 206 may be configured to transmit and receive radio frequency (RF) signals and may comprise a loop antenna and/or any other suitable configuration. The transmit/receive circuitry 208 may be coupled between the antenna 206 and the control/storage circuitry 204.

In operation, wireless signals (e.g., RF signals) may be received by the antenna 206 and supplied to the transmit/receive circuitry 208, which in response may provide signals that are supplied to the control/storage circuitry 204. The control/storage circuitry 204 may also provide signals that are supplied to the transmit/receive circuitry 208, which in response may provide signals that are supplied to the antenna 206 and transmitted thereby.

In some embodiments, the control/storage circuit 204 and the transmit/receive circuitry 208 are disposed in a single integrated circuit. In some embodiments, the control/storage circuitry 204 and the transmit/receive circuitry 208 are disposed in an RFID IC. Unless stated otherwise, the term RFID is not limited to a specific type of RFID. In some embodiments, an RFID may be a simple memory device capable only of responding to a pre-defined set of commands. In some other embodiments, an RFID may comprise a microcontroller capable of executing a program. Some embodiments may include further features. Some embodiments may comprise other configurations altogether. In some embodiments, the RFID IC comprises an IC that uses contactless technology, such as, for example, as specified in international standard ISO/IEC 14443.

As stated above, in some embodiments, the communication device 106 comprises a cell phone.

Figure 3:
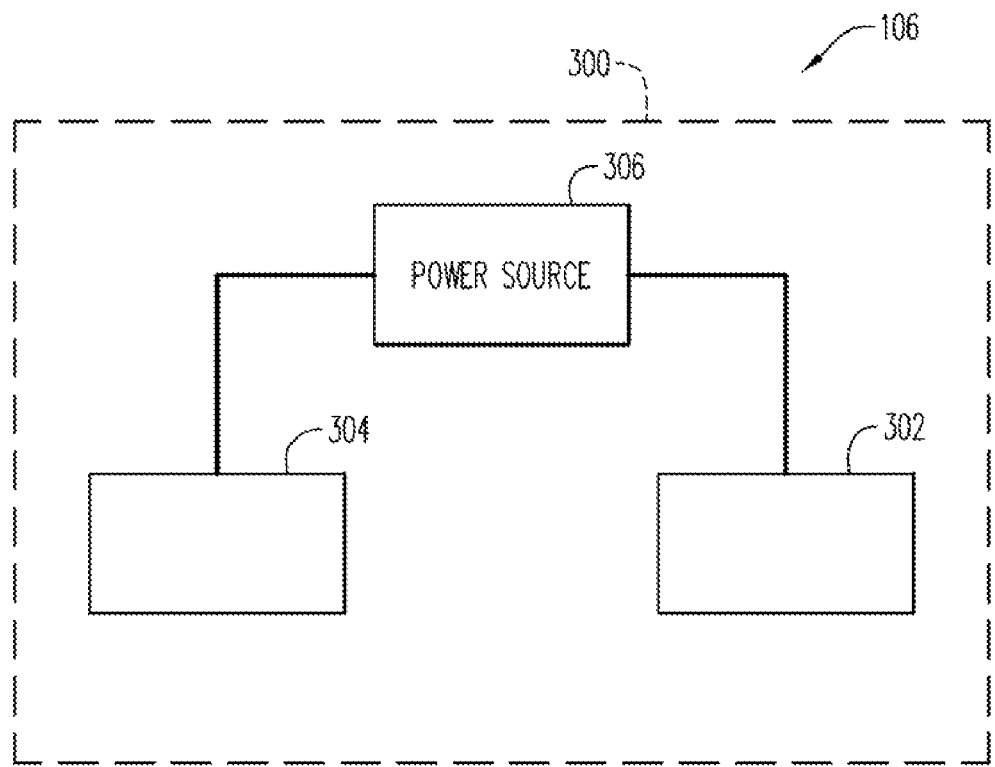
FIG. 3 is a schematic block diagram of communication device, according to some embodiments.

FIG. 3 is a schematic block diagram of communication device 106 that comprises a cell phone 300, according to some embodiments. Referring to FIG. 3, the cell phone 300 includes first and second subsystems 302, 304. The first subsystem 302 may include circuitry and/or other components to perform wireless communication with a cellular network. The second subsystem 304 may include circuitry and/or other components to perform near field communication.

Although the first subsystem 302 is shown separate from the second subsystem 304, in some embodiments, the first subsystem 302 and the second subsystem 304 may share one or more circuits and/or components.

The cell phone may further include a power source 306. The power source 306 may be coupled (directly and/or indirectly) and/or supply power (directly and/or indirectly) to the first subsystem 302 and/or the second subsystem 304. In some embodiments, the power source 306 comprises a battery.

Figure 4:
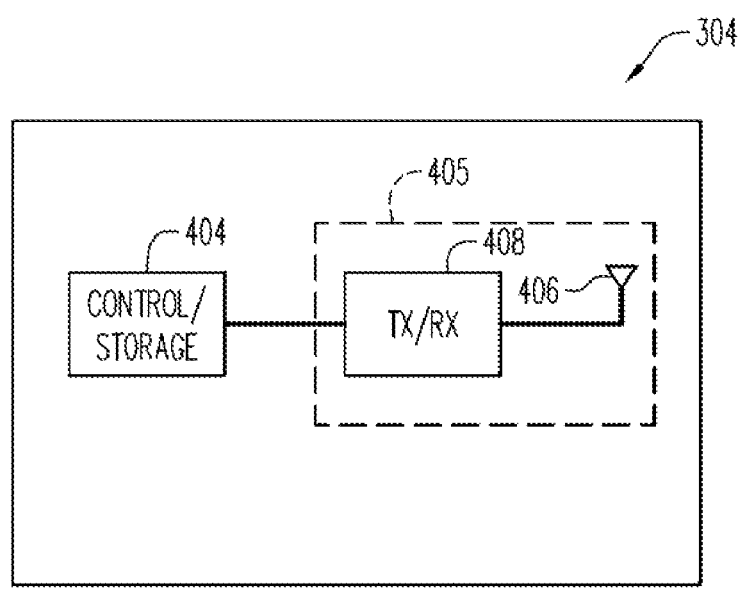
FIG. 4 is a schematic block diagram of a subsystem of the communication device of FIG. 3, according to some embodiments.

FIG. 4 is a schematic block diagram of the second subsystem 304, according to some embodiments. Referring to FIG. 4, in accordance with some embodiments, the second subsystem 304 includes control/storage circuitry 404 and a wireless communication interface 405.

In some embodiments, the control/storage circuitry 404 may be a simple memory device capable only of responding to a pre-defined set of commands. In some other embodiments, the control/storage circuitry 404 may comprise a secure microcontroller capable of executing a pre-defined program.

The wireless communication interface 405 facilitates wireless communication. In some embodiments, wireless communication interface 405 comprises an antenna 406 and transmit/receive circuitry 408. The antenna 406 may be configured to transmit and receive radio frequency (RF) signals and may comprise a loop antenna and/or any other suitable configuration. The transmit/receive circuitry 408 may couple the antenna 406 to the control/storage circuitry 404.

In some embodiments, the control/storage circuit 404 and the transmit/receive circuitry 408 are disposed in a single integrated circuit. In some embodiments, the control/storage circuit 404 and the transmit/receive circuitry 408 are disposed in an IC that uses NFC technology, such as, for example, an NFC IC provided by PHILIPS ELECTRONICS or NXP Semiconductors.

In operation, wireless signals (e.g., RF signals) are received by the antenna 406 and supplied to the transmit/receive circuitry 408, which in response may provide signals that are supplied to the control/storage circuitry 404. The control/storage circuitry 404 may also provide signals that are supplied to the transmit/receive circuitry 408, which in response, may provide signals that are supplied to the antenna 406 and transmitted thereby.

Figure 5:
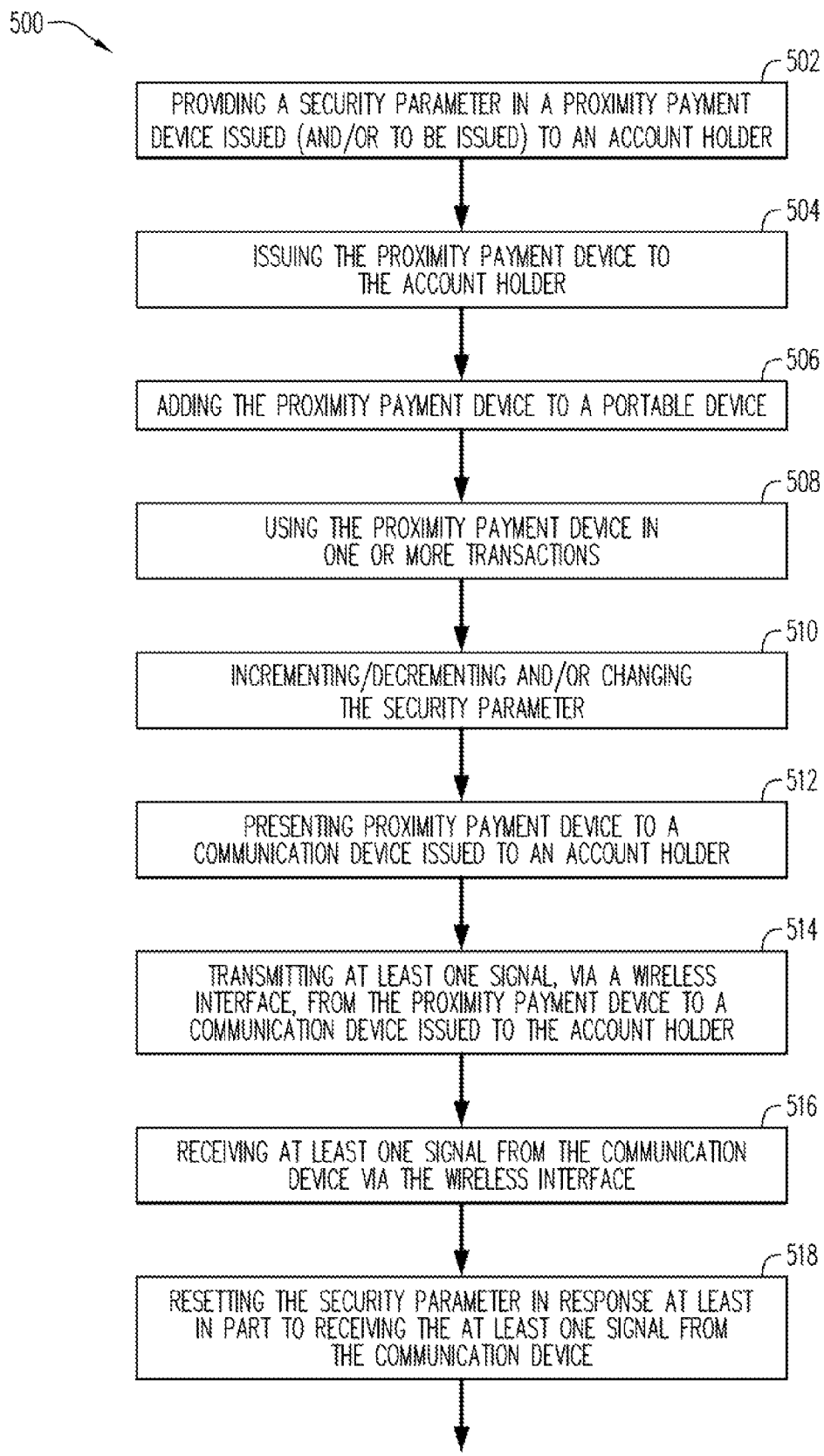
FIG. 5 is a flow chart that illustrates a method, according to some embodiments.

FIG. 5 is a flow chart 500 of a method according to some embodiments. In some embodiments, one or more portions of the method may be used in association with the proximity payment device 102 and communication device 106. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 502, the method may include providing a security parameter in a proximity payment device issued, and/or to be issued, to an account holder. In some embodiments such security parameter comprises an EMV risk parameter that is provided in the course of personalization and/or a pre-personalization of the proximity payment device. As is known, pre-personalization of the proximity payment device may include storing information such as keys to be used in subsequent transactions and/or parameters to be used to select a particular card brand to be borne by the proximity payment device. This may include writing information such as loading of keys to be used in subsequent transactions and parameters (such as to select a particular card brand to be borne by the proximity payment device) into the control/storage circuitry 204 (FIG. 2) of the proximity payment device. Pre-personalization may further include printing information such as a payment card association brand, etc., on the proximity payment device. If a multiple proximity payment devices are processed as a batch, the information transmitted to each proximity payment device and/or printed on each proximity payment device may be the same for all proximity payment devices in the batch.

Personalization of the proximity payment device may include assigning the proximity payment device to a particular payment account and/or a particular account holder by storing information in the proximity payment device. This may include writing a payment card account number and a name of the account holder into the control/storage circuitry 204 (FIG. 2) of a proximity payment device. Other information, such as expiration date, may be stored in either of the pre-personalization and personalization steps. Personalization may further include printing the payment account number and/or any other information (or a portion thereof) that was (or is to be) stored in the proximity payment device 102 on a surface of the proximity payment device 102. In some embodiments, pre-personalization and personalization steps may be combined into one step. In some embodiments, personalization and/or pre-personalization is carried out using contactless card programming equipment commonly used to program proximity payment cards, such as for example, a model 9000 available from Datacard Group, Minnetonka, Minn.

Unless stated otherwise, the term "issued to" may include, but is not limited to, given to, loaned to, rented to, sold to, and/or transferred to.

At 504, the method may further include issuing the proximity payment device to the account holder. Unless stated otherwise, the term "issuing" may include, but is not limited to, giving, loaning, renting, selling and/or transferring. In some embodiments, issuing the proximity payment device to the account holder includes mailing and/or otherwise sending the proximity payment device to the account holder.

At 506, the method may further include adding the proximity payment device to a cell phone, a music player, a video player, a PDA, a wristwatch, a wristband, a bracelet, a pendant, a key fob and/or any other type of consumer or portable device such that the proximity payment device is supported by a body of the portable device. In some embodiments, this is carried out by the account holder, after the proximity payment device is issued to the account holder.

At 508, the method may further include using the proximity payment device in one or more transactions. In some embodiments, this may be carried out in a conventional manner, e.g., in accordance with the above-mentioned "PayPass" standard. For example, the proximity payment device may be presented to a proximity coupling device (not shown) of a POS terminal (not shown) to accomplish payment for a transaction. The proximity coupling device may transmit an interrogation signal. The proximity payment device may receive the interrogation signal via the antenna 206 (FIG. 2). The received interrogation signal may cause the circuitry of the proximity payment device to be powered-up. For example, the proximity payment device may include circuitry to rectify the received interrogation signal to generate a DC power that may be used to power the control/storage circuitry 204 (FIG. 2) and transmit/receive circuitry 208 (FIG. 2). The proximity payment device may transmit a signal to the proximity coupling device in response to the interrogation signal. The proximity payment device may transmit the signal (and possibly one or more additional signals) to the proximity coupling device via the antenna 206 (FIG. 2). One or more signals transmitted by the proximity payment device may include a payment card account number and/or other information required for interaction with the proximity coupling device. In some embodiments, the proximity payment device may transmit the payment card account number and/or other information via the antenna 206 (FIG. 2) after a handshake procedure or the like with the POS terminal. The POS terminal may then interact with a payment card system to charge the current sales transaction to the payment card account represented by the payment card account number received from the proximity payment device.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

At 510, the value of the EMV risk parameter may be incremented, decremented and/or changed in any other way in response to one or more of such transactions.

At 512, the method may include presenting the proximity payment device to a communication device issued to the account holder. In some embodiments, the proximity payment device may be presented to the communication device by simply positioning the proximity payment device within wireless communication range of the communication device. In some embodiments, the proximity payment device may be presented to the communication device by positioning the proximity payment device in physical contact with, and/or by tapping a portion of the proximity payment device on, the communication device.

At 514, the method may further include transmitting at least one signal, via a wireless interface, from the proximity payment device to the communication device. In accordance with some embodiments, the at least one signal may include a request for authorization to reset the EMV risk parameter. In accordance with some embodiments, the communication device may transmit the request to an authorization device.

At 516, the method may further include receiving at least one signal from the communication device via the wireless interface. In accordance with some embodiments, the at least one signal may include authorization to reset the EMV risk parameter. In accordance with some embodiments, the communication device may receive the authorization from the authorization device.

At 518, the method may further include resetting a security parameter in the proximity payment device in response at least in part to receiving the at least one signal from the communication device. Notably, the parameter may or may not be reset to its initial value and/or attribute. Moreover, in some embodiments, an EMV risk parameter and/or other security parameter may be reset before the proximity payment device becomes unusable.

Figure 6:
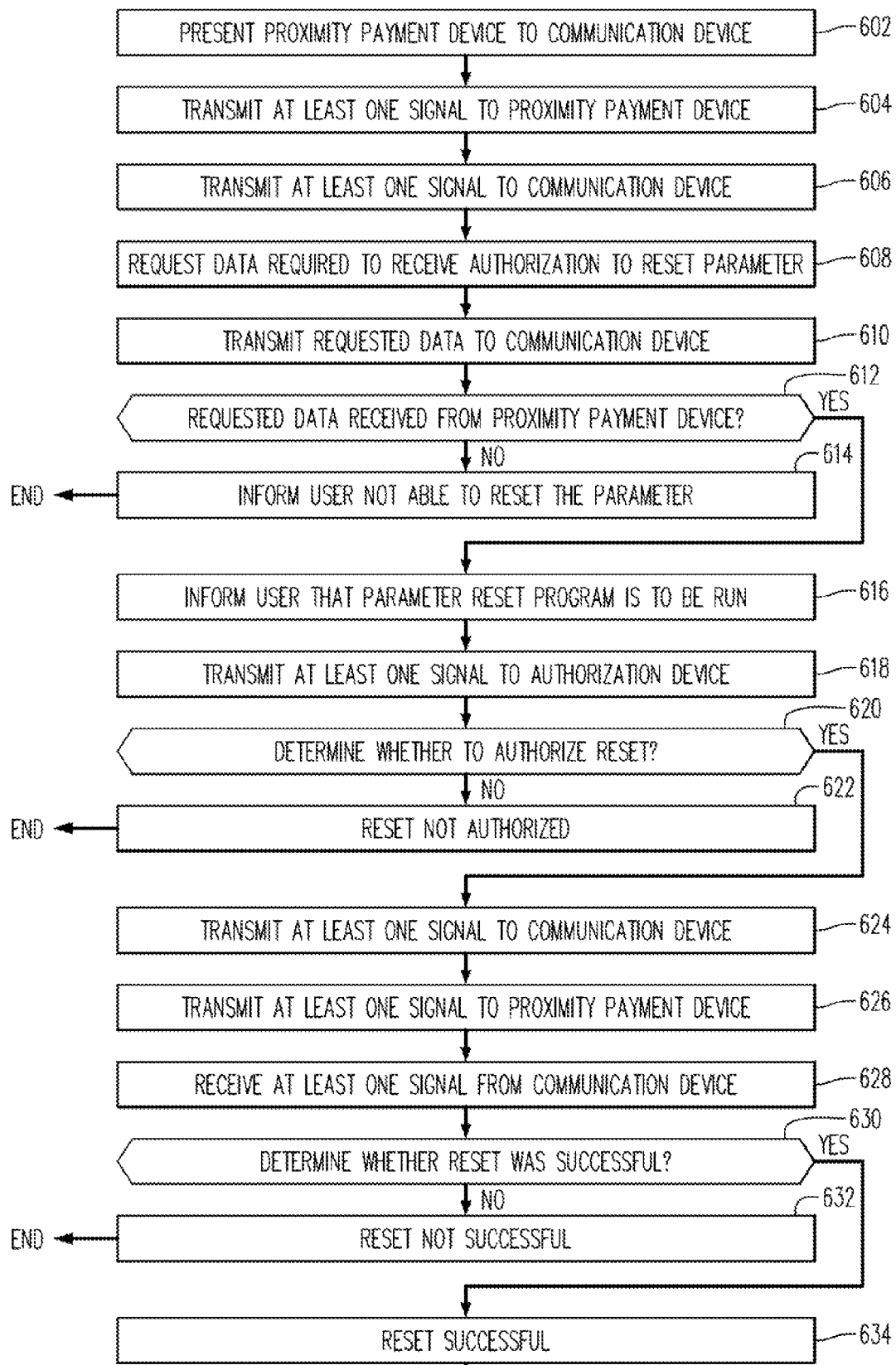
FIG. 6 is a flow chart that illustrates a method, according to some embodiments.

FIG. 6 shows a flow chart 600 of a method that may be used in resetting a EMV risk parameter, according to some embodiments. In some embodiments, one or more portions the method may be used in association with the proximity payment device 102 and communication device 106 in order to reset the EMV risk parameter stored in the proximity payment device 102. In some embodiments, one or more portions of the method may be used at 510-518 in the method of FIG. 5. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 602, the method may include presenting a proximity payment device to a communication device. The communication device may recognize the proximity payment device, and at 604, the communication device may transmit at least one signal to the proximity payment device. In some embodiments, the at least one signal may be transmitted via the antenna 406 (FIG. 4) and may be similar to an interrogation signal of the above-mentioned "PayPass" standard. In some embodiments, the at least one signal includes a query as to a status of the EMV risk parameter in the proximity payment device.

The proximity payment device may receive the at least one signal transmitted by the communication device. In some embodiments, the at least one signal may be received via the antenna 206 (FIG. 2) and may cause the proximity payment device to be powered-up. For example, the proximity payment device may include circuitry to rectify the received request signal to generate DC power that may be used to power the control/storage circuitry 204 (FIG. 2) and transmit/receive circuitry 208 (FIG. 2).

At 606, the proximity payment device may transmit at least one signal to the communication device. The at least one signal may comprise a request for authorization to reset the EMV risk parameter. In some embodiments, the at least one signal transmitted by the communication device includes a query and the proximity payment device transmits the request for authorization in response, at least in part, to such query. In some other embodiments, the proximity payment device transmits the at least one signal without receiving any signals from the communication device.

The communication device may receive the at least one signal transmitted by the proximity payment device, and if the at least one signal comprises a request for authorization to reset the EMV risk parameter, then at 608, the communication device may request an account number and/or other data that may be required to receive authorization to reset the EMV risk parameter.

The proximity payment device may receive the request for data, and at 610, the proximity payment device may transmit the requested data to the communication device.

The communication device may receive the data transmitted by the proximity payment device, and at 612, the communication device may determine whether the data includes the requested data. If the communication device determines that the data does not include the requested data, then at 614, the communication device may inform a user that the EMV risk parameter is not able to be reset. In some embodiments, the communication device informs and/or prompts the user using a display. In some embodiments, information supplied to and/or by the display comprises information supplied by the proximity payment device. In some embodiments, information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the proximity payment device (iii) a brand and/or logo of a specific card product.

At 612, if the communication device determines that the data includes the requested data, then at 616, the communication device may inform the user that an EMV risk parameter reset program is to be run.

At 618, the communication device may transmit at least one signal to an authorization device. In some embodiments, the at least one signal comprises a request for authorization to reset the EMV risk parameter and/or data that may be required to receive such authorization. In some embodiments, the authorization device comprises a device operated by the issuer and/or a device operated by a party associated with the issuer.

In some embodiments, the method includes establishing a communication channel to connect the communication device and the authorization device. In some embodiments, the method includes establishing a communication channel to connect the proximity payment device and the authorization device.

If the communication device comprises a cell phone, the proximity payment device may transmit the at least one signal via a communication link that includes the cellular network. If the communication device comprises a computer, the communication device may transmit the at least one signal via a communication link that includes a telephone line and/or a network, e.g., the Internet.

The authorization device may receive the at least one signal transmitted by the communication device, and at 620, the authorization device may determine whether to authorize reset of the EMV risk parameter. In some embodiments, this determination is based on whether or not risk of fraud and/or bad debt is low, e.g., the proximity payment device is not reported lost and the account is in good standing.

If the authorization device determines not to authorize reset of the EMV risk parameter, then at 622, the authorization device may inform the communication device, which may in turn inform the user that the EMV risk parameter is not authorized to be reset.

At 620, if the authorization device determines to authorize reset of the EMV risk parameter, then at 624, the authorization device may transmit at least one signal to the communication device. In some embodiments, the at least one signal includes an authorization to reset the EMV risk parameter. In some embodiments, the authorization comprises a script to be executed by the proximity payment device to reset the EMV risk parameter.

The communication device may receive the at least one signal transmitted by the authorization device, and at 626, the communication device may transmit the at least one signal to the proximity payment device.

At 628, the proximity payment device may receive the at least one signal transmitted by the communication device. If the at least one signal includes an authorization to reset the EMV risk parameter, the proximity payment device may reset the EMV risk parameter in response at least thereto. If the at least one signal includes a script, the proximity payment device may execute the script to reset the EMV risk parameter.

At 630, the communication device and/or the proximity payment device may determine whether the reset was successful. If the reset was not successful, then at 632, the communication device may inform the user and/or the authorization device that the reset was not successful.

At 630, if the reset was successful, then at 634, the communication device may inform the user and/or the authorization device that the reset was successful.

In some embodiments, the communication device may be used in resetting the EMV risk parameter in any number of proximity payment devices on any number of occasions. In some embodiments, the communication device may be used in resetting the EMV risk parameter in only a limited number of proximity payment devices and/or on only a limited number of occasions.

In some embodiments, the communication device may include a counter indicative of the number of occasions that the communication device may be used in resetting the EMV risk parameters. The counter may be decremented each time that the communication device is used in resetting an EMV risk parameter. If the counter reaches zero, the communication device may no longer be used in resetting an EMV risk parameter. Some embodiments may allow the issuer to reset or increment the counter so that the communication device may again be used in resetting an EMV risk parameter.

In some embodiments, one or more authentication protocols may be used in addition to and/or in lieu of the one or more portions of the methods disclosed herein.

In some embodiments, the authorization device may transmit a request for a user identifier prior to transmitting an authorization to reset the EMV risk parameter. In accordance with some embodiments, a user identifier may be required if an online purchase transaction is attempted. In some embodiments, the communication device may receive the request for the user identifier and may prompt the user to enter a user identifier (e.g., using a keypad). In accordance with some embodiments, a visible and/or audible indication may be provided to indicate that the attention of the user is required. If the user enters a user identifier, the communication device may transmit the user identifier to the authorization device. The authorization device may determine whether the user identifier is valid. If the authorization device determines that the user identifier is not valid, the authorization device may inform the communication device of such, and the communication device may inform the user. The user may be given one or more additional opportunities to enter a user identifier, however, the authorization device may not transmit the authorization to reset the EMV risk parameter unless a valid user identifier is received.

In some embodiments, the communication device may store any data that may be required to receive authorization to reset the EMV risk parameter. In some embodiments, such data comprises the data received at 612 of the method of FIG. 6. The communication device may thereafter request authorization to reset an EMV risk parameter even though the proximity payment device may not be present. The communication device may thereafter receive authorization to reset the EMV risk parameter, which the communication device may transmit to the proximity payment device when the proximity payment device is next presented to the communication device. In some embodiments, the authorization may expire if not transmitted to the proximity payment device within a certain period of time, which may be specified by the authorization device at the time that the authorization is transmitted to the communication device. In some embodiments, this is carried out by performing portions 602-604 of the method of FIG. 6 after portion 624 and without performing portions 606-614.

Thus, in some embodiments, it is possible to reset the EMV risk parameter in a proximity payment device without having to provide a communication channel between the communication device and the authorization device. Notably such a communication channel may not always be available and/or may be inconvenient to provide and/or wait for.

In some embodiments, the communication device may request authorization on a periodic basis, shortly before an authorization expires and/or after an authorization expires, so as to have an authorization available when the proximity payment device is next presented to the communication device.

In some embodiments, the communication device 106 may include information that defines a schedule for requesting authorization. In some embodiments, one or more portions of the information that defines the schedule may be supplied by and/or based at least in part on data supplied by the account holder.

In some embodiments, an account holder may present the proximity payment device to the communication device on a periodic basis. In some embodiments, an account holder may present the proximity payment device to the communication device at night.

In some embodiments, the proximity payment device 102, the communication device 106 and/or the authorization device 108 may transmit and/or receive signals that include data not related to resetting a security parameter in the proximity payment device. In some embodiments, such signals may be transmitted and/or received to and/or from one another and/or one or more other devices.

In some embodiments, the communication device 106 may include information that defines the data to be transmitted and/or received and/or a schedule for transmitting and/or receiving such data. The communication device 106 may also include information that defines one or more sources and/or destinations for such data. In some embodiments, one or more portions of such information may be supplied by and/or based at least in part on data supplied by the account holder.

In some embodiments, the authorization device comprises a device that is operated by and/or on behalf of an issuer of the proximity payment device. In some embodiments, the authorization device comprises a device operated by and/or on behalf of a party associated with the issuer of the proximity payment device.

In some embodiments, the communication device 106 comprises a first communication device issued to an account holder and the communication link 109 comprises a second communication device issued to the account holder.

Figure 7:
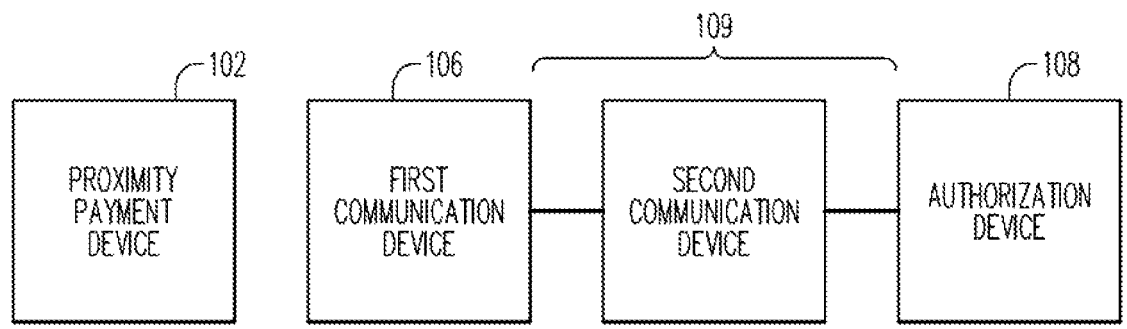
FIG. 7 is a schematic block diagram of a system, according to some embodiments.

FIG. 7 is a schematic block diagram of a system 100 to reset an EMV risk parameter and/or other security parameter(s) stored in a proximity payment device issued to an account holder, in accordance with some embodiments.

Referring to FIG. 7, in accordance with some embodiments, the system 100 includes a proximity payment device 102 issued to an account holder 104, a first communication device 106 issued to the account holder, a second communication device issued to the account holder and an authorization device 108.

In accordance with some embodiments, the first communication device 106 couples the proximity payment device 102 to the second communication device. The second communication device may be coupled to the authorization device 108.

Figure 8:
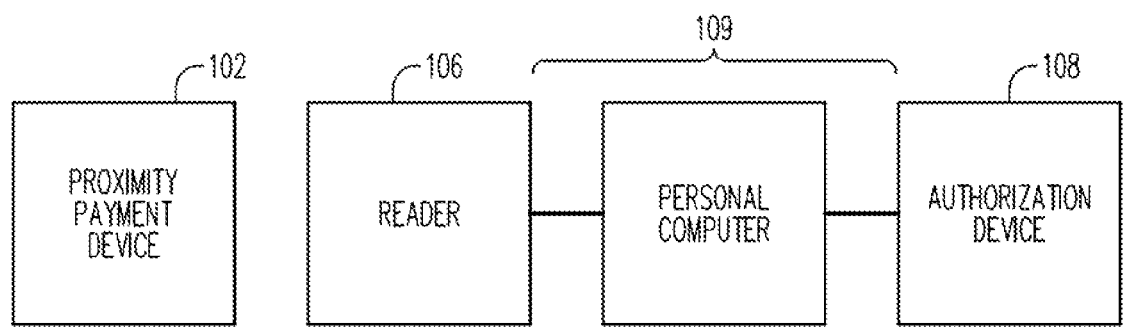
FIG. 8 is a schematic block diagram of a system, according to some embodiments.
Figure 10:
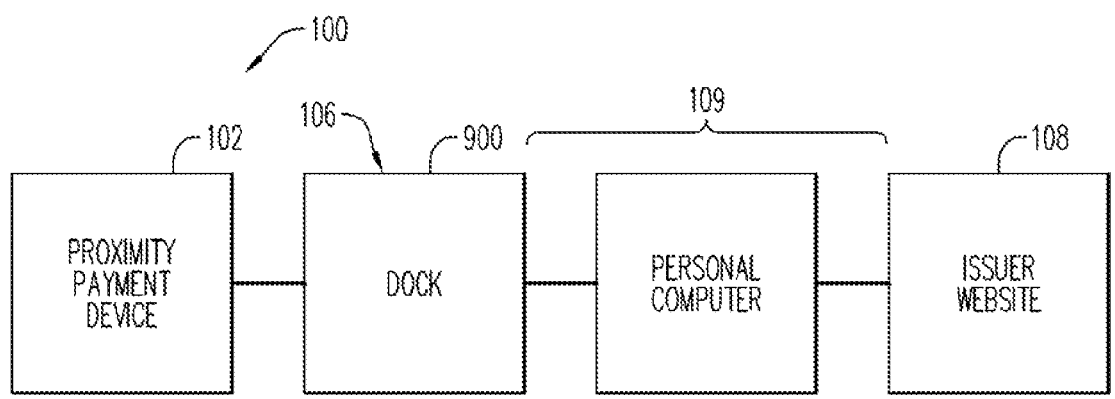
FIG. 10 is a schematic block diagram of a system, according to some embodiments.

In some embodiments, the first communication device 106 comprises a reader and the second communication device comprises a personal computer (FIG. 8). In some embodiments, the first communication device 106 comprises a dock and the second communication device comprises a personal computer (FIG. 10). In some embodiments, the authorization device 108 comprises a website (see FIG. 10). In some embodiments, the authorization device 108 comprises a website of an issuer of the proximity payment device 102 (see FIG. 10). In some embodiments the authorization device comprises an issuer device coupled to a payment server (see FIG. 11). In some embodiments the issuer device is coupled to the payment server by a Banknet.

In some embodiments, the system 100 may be used to communicate other information.

FIG. 8 is a schematic block diagram of a system 100 to reset an EMV risk parameter and/or other security parameter(s) stored in a proximity payment device issued to an account holder, in accordance with some embodiments.

Referring to FIG. 8, in accordance with some embodiments, the system 100 includes a proximity payment device 102 issued to an account holder 104, a communication device 106 that comprises a reader issued to the account holder, a personal computer and an authorization device 108.

In accordance with some embodiments, the reader couples the proximity payment device 102 to the personal computer. The personal computer may be coupled to the authorization device 108 by the Internet.

In some embodiments, the system 100 may be used to communicate other information.

As stated above, in some embodiments, the communication device 106 comprises a dock.

Figure 9:
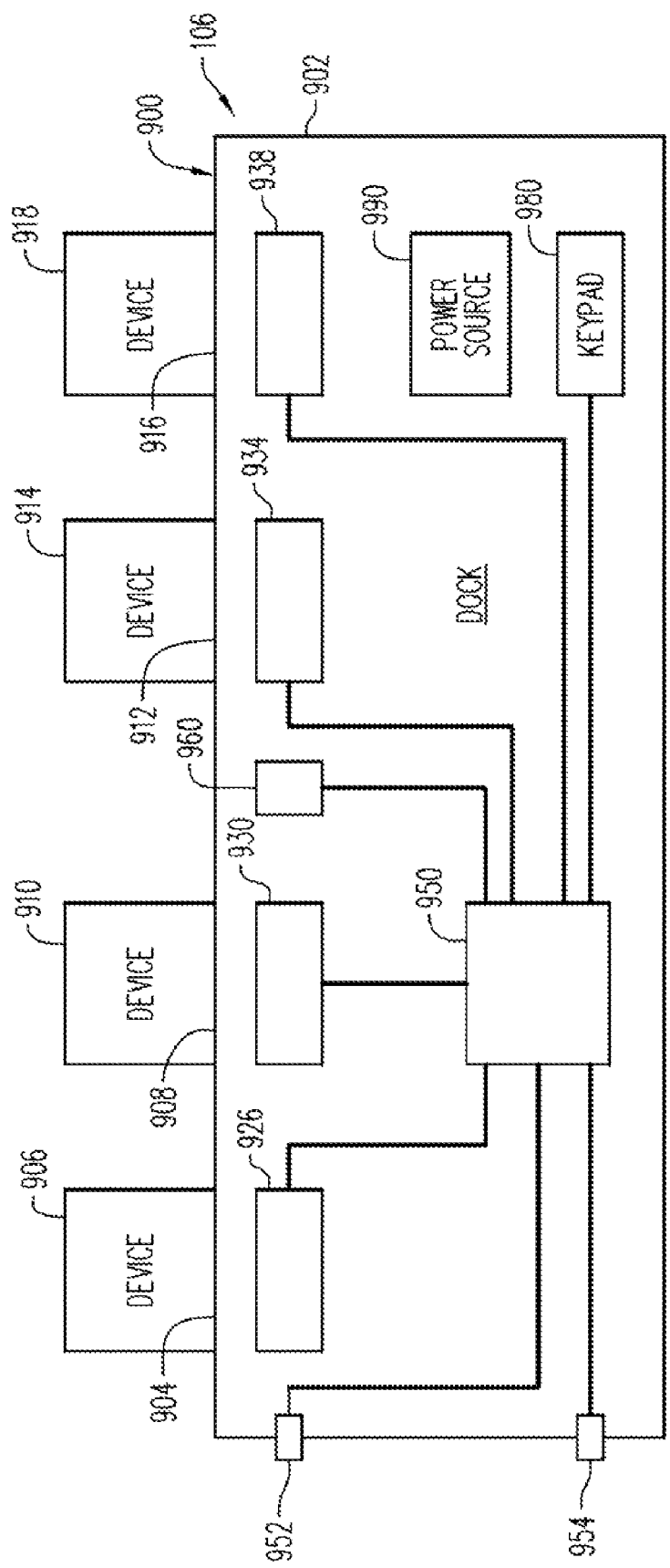
FIG. 9 is a schematic block diagram of communication device, according to some embodiments.

FIG. 9 is a schematic block diagram of communication device 106 that comprises a dock 900, according to some embodiments. Referring to FIG. 9, the dock 900 may include a body 902 that defines plurality of seats to receive a plurality of devices. In some embodiments, such plurality of seats may include a first seat 904 to receive a first device 906, a second seat 908 to receive a second device 910, a third seat 912 to receive a third device 914, and a fourth seat 916 to receive a fourth device 918.

In some embodiments, at least one of the first device 906, the second device 910, the third device 914 and the fourth device 918 may comprise at least one of a cell phone, a wristwatch, a portable data assistant, a music player and a key fob. In some embodiments, at least one of the first device 906, the second device 910, the third device 914 and the fourth device 918 comprises a proximity payment device In some embodiments, the first device 906, the second device 910, the third device 914 and the fourth device 918 may each include a wireless interface. In some embodiments, at least one of the first device 906, the second device 910, the third device 914 and the fourth device 918 may comprise a proximity payment device that is the same as and/or similar to the proximity payment device 102.

The dock 900 may further include a plurality of wireless communication interfaces to communicate with the plurality of devices. In some embodiments, such plurality of wireless communication interfaces may include a first wireless communication interface 926, a second wireless communication interface 930, a third wireless communication interface 934 and a fourth wireless communication interface 938. The first wireless communication interface 926 may communicate with the wireless communication interface of the first device 906. The second wireless communication interface 930 may communicate with the wireless communication interface of the second device 910. The third wireless communication interface 934 may communication with wireless communication interface of the third device 914. The fourth wireless communication interface 938 may communication with wireless communication interface of the fourth device 918. In some embodiments, the first wireless communication interface 926, the second wireless communication interface 930, the third wireless communication interface 934 and the fourth wireless communication interface 938 may each be supported by the body 902 and may each include circuitry and/or other components to perform near field communication.

In some embodiments, the first wireless communication interface 926, the second wireless communication interface 930, the third wireless communication interface 934 and the fourth wireless communication interface 938 are adjacent to a wall of the body 902 so as to help maximize the range of the interfaces 926, 930, 934, 938 outside the body 902.

The dock may further include a controller 950. In some embodiments, the controller 950 is adapted to selectively couple the first wireless communication interface 926, the second wireless communication interface 930, the third wireless communication interface 934, and/or the fourth wireless interface 938 to one or more others of the first wireless communication interface 926, the second wireless communication interface 930, the third wireless communication interface 934, and the fourth wireless interface 938.

Thus, in some embodiments, the dock may facilitate communication between at least one of the first device 906, the second device 910, the third device 914 and the fourth device 918 and at least one other of the first device 906, the second device 910, the third device 914 and the fourth device 918.

The dock may further include a first port 952 and a second port 954. In some embodiments, the first port 952 is connected to a personal computer and/or another device. In some embodiments, the second port 954 is connected to a wired public telephone network.

In some embodiments, the dock 900 may facilitate communication between at least one of the first device 906, the second device 910, the third device 914 and the fourth device 918 and at least one other device via port 952 and/or 954. In some embodiments, the dock may facilitate transfer of data between at least one of the first device 906, the second device 910, the third device 914 and the fourth device 918 and a personal computer. In some embodiments, the personal computer is coupled to the Internet.

As stated above, in some embodiments, the proximity payment device 102, the communication device 106 and/or the authorization device 108 may transmit and/or receive signals that include data not related to resetting a security parameter in the proximity payment device. In some embodiments, such signals may be transmitted and/or received to and/or from one another and/or one or more other devices.

In some embodiments, the dock 900 may include information that defines the data to be transmitted and/or received and/or a schedule for transmitting and/or receiving such data. The dock 900 may also include information that defines one or more sources and/or destinations for such data. In some embodiments, one or more portions of such information may be supplied by and/or based at least in part on data supplied by the account holder.

The dock 900 may further comprise a polling antenna 960. The polling antenna 960 may be used in detecting whether any devices with wireless communication interfaces are within range of any of the wireless communication interfaces of the dock 900. In some embodiments, the polling antenna comprises an antenna to receives signals from the wireless communication interface of the first device, the wireless communication interface of the second device, the wireless communication interface of the third device and/or the wireless communication interface of the fourth device.

The dock may further include a power source 990. The power source 990 may be coupled (directly and/or indirectly) and/or supply power (directly and/or indirectly) to the circuits and/or components of the dock 900. In some embodiments, the power source 990 comprises a battery. In some embodiments, a power source may comprise a power supply that receives power from an AC outlet.

In some embodiments, the dock 900 may include criteria for selecting a communication interface via which to transmit and/or receive signals.

In some embodiments, the criteria may include selecting a communication interface of the dock based at least in part on speed, reliability and/or security of a communication link that may be connected to the communication interface. In that regard, in some embodiments, the criteria may include selecting a communication interface of the dock via which communication with a desired device may be fastest, most reliable and/or most secure.

In some embodiments, the criteria may include selecting a communication interface of the dock that is connected to the Internet and/or via which communication with a desired device may include communication via the Internet.

In some embodiments, the criteria may include selecting a communication interface of the dock that communicates with a wireless communication interface of a cell phone, in the event that a connection (direct or indirect) to the Internet is not available.

In some embodiments, the criteria may include selecting a communication interface of the dock that communicates with a wired public telephone network, in the event that a connection (direct or indirect) to the Internet and a connection (direct or indirect) to a cell phone are not available.

In some embodiments, the dock 900 further includes a key pad 980. The key pad 980 may or may not be supported by the body 902 of the dock 900.

FIG. 10 is a schematic block diagram of a system 100, in accordance with some embodiments. Referring to FIG. 10, in accordance with some embodiments, the system 100 includes a proximity payment device 102 issued to an account holder 104, a communication device 106 that comprises a dock 900 issued to the account holder, a personal computer and an authorization device 108.

In accordance with some embodiments, the dock 900 couples the proximity payment device 102 to the personal computer. The personal computer is coupled to authorization device 108 by the Internet. In some embodiments, the authorization device comprise an issuer website.

In some embodiments, the system 100 may be used to reset an EMV risk parameter and/or other security parameter(s) stored in the proximity payment device 102 issued to an account holder.

In some embodiments, the system 100 may be used to communicate other information.

Figure 11:
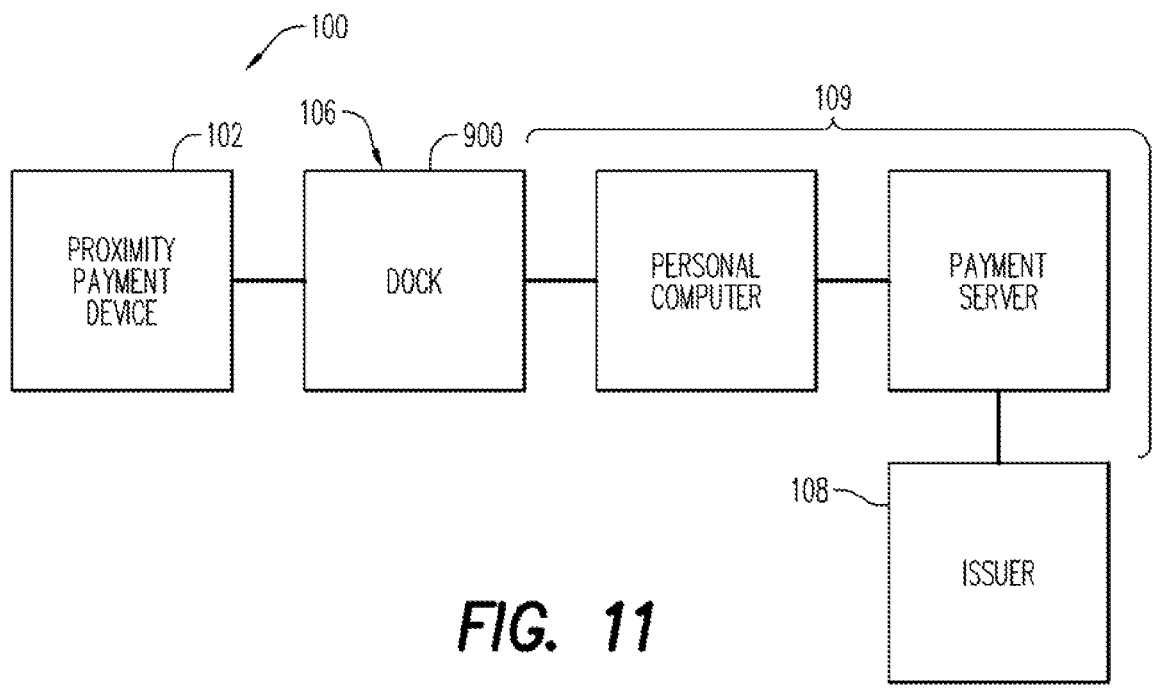
FIG. 11 is a schematic block diagram of a system, according to some embodiments.

FIG. 11 is a schematic block diagram of a system 100, in accordance with some embodiments. Referring to FIG. 11, in accordance with some embodiments, the system 100 includes a proximity payment device 102 issued to an account holder 104, a communication device 106 that comprises a dock 900 issued to the account holder, a personal computer a payment server and an authorization device 108.

In accordance with some embodiments, the dock 900 couples the proximity payment device 102 to the personal computer. The personal computer is coupled to payment server by the Internet. The payment server is coupled to the authorization device 108 by a Banknet. In some embodiments, the authorization device comprises an issuer device.

In some embodiments, the system 100 may be used to reset an EMV risk parameter and/or other security parameter(s) stored in the proximity payment device 102 issued to an account holder.

In some embodiments, the system 100 may be used to communicate other information.

Figure 12:
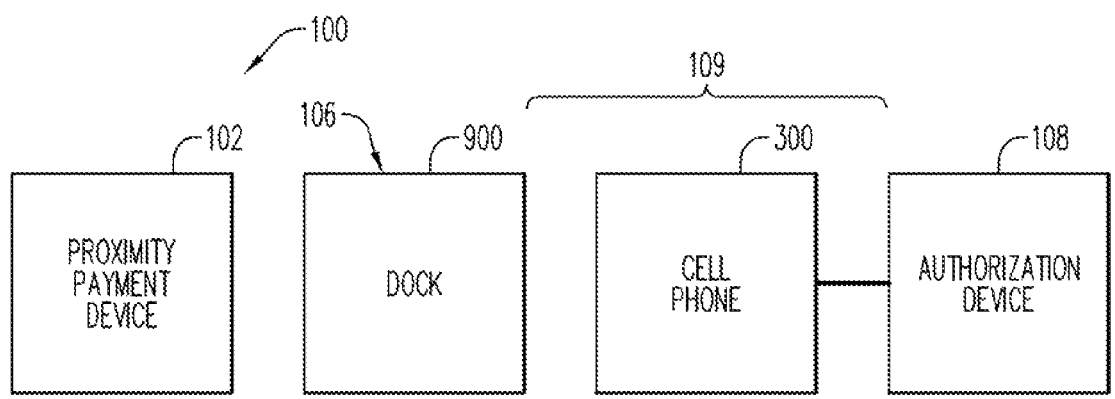
FIG. 12 is a schematic block diagram of a system, according to some embodiments.

FIG. 12 is a schematic block diagram of a system 100, in accordance with some embodiments. Referring to FIG. 12, in accordance with some embodiments, the system 100 includes a proximity payment device 102 issued to an account holder 104, a communication device 106 that comprises a dock 900 issued to the account holder, a cell phone 300 issued to an account holder and an authorization device 108.

In accordance with some embodiments, the dock 900 couples the proximity payment device 102 to the cell phone 300. The cell phone 300 couples is coupled to the authorization device via the cellular network.

In some embodiments, the system 100 may be used to reset an EMV risk parameter and/or other security parameter(s) stored in the proximity payment device 102 issued to an account holder.

In some embodiments, the system 100 may be used to communicate other information.

Figure 13A:
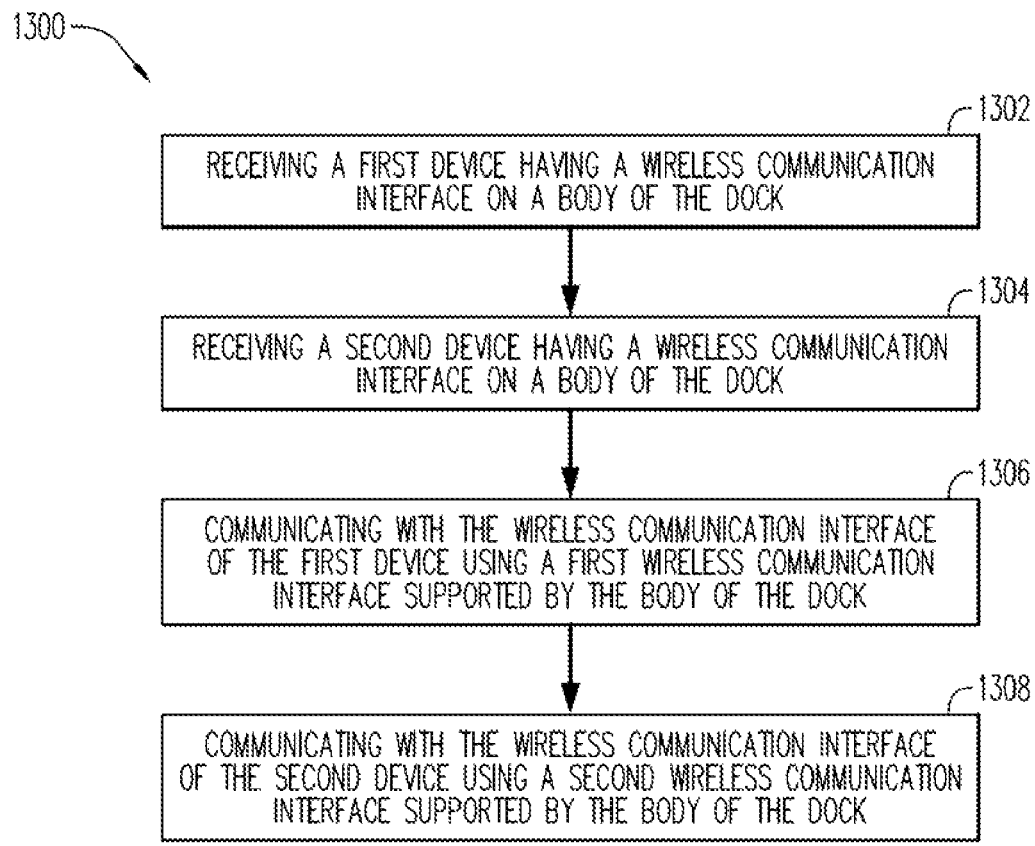
FIG. 13A a flow chart that illustrates a method, according to some embodiments.

FIG. 13A is a flow chart 1300 of a method according to some embodiments. In some embodiments, one or more portions of the method may be used in association with the proximity payment device 102 and dock 900. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 1302, the method may include receiving a first device having a wireless communication interface on a body of a dock.

At 1304, the method may further include receiving a second device having a wireless communication interface on the body of the dock.

At 1306, the method may further include communicating with the wireless communication interface of the first device using a first wireless communication interface supported by the body of the dock.

At 1308, the method may further include communicating with the wireless communication interface of the second device using a second wireless communication interface supported by the body of the dock.

Figure 13B:
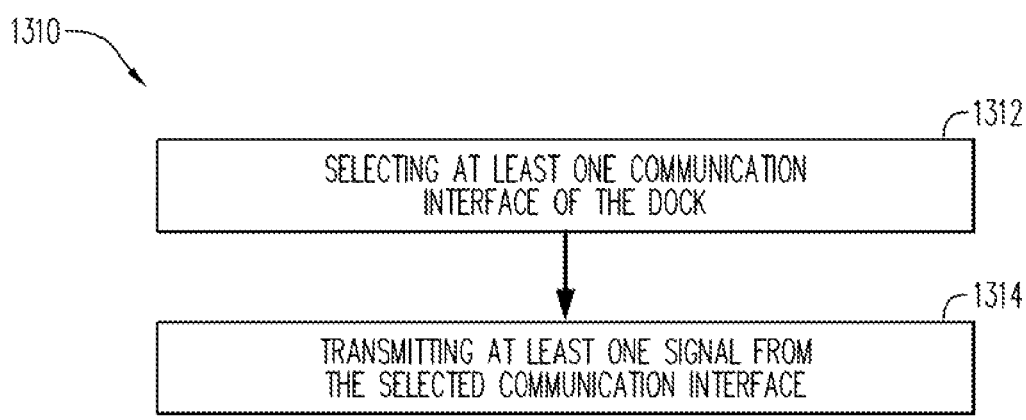
FIG. 13B a flow chart that illustrates a method, according to some embodiments.

FIG. 13B is a flow chart 1310 of a method according to some embodiments. In some embodiments, one or more portions of the method may be used in association with the proximity payment device 102 and dock 900. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 1312, the method may include selecting at least one communication interface of the dock. In some embodiments, this may include identifying at least one communication interface of the dock that is capable of transmitting to a device and selecting a communication interface of the at least one communication interface that is capable of transmitting at least one signal to the device. In some embodiments, the device may comprise an authorization device or other any other desired device.

In some embodiments, the method may include selecting at least one of a wired communication interface of the dock and a wireless communication interface of the dock.

In some embodiments, this may include polling to detect a wireless communication interface within range of the dock and/or selecting a wireless communication interface of the dock capable of communicating with the wireless communication interface within range of the dock. In some embodiments, this may include polling to detect all wireless communication interfaces within range of the dock and identifying all wireless communication interfaces of the dock capable of communicating with the wireless communication interfaces within range of the dock. The method may further include selecting a wireless communication interface from the wireless communication interfaces of the dock capable of communicating with the wireless communication interfaces within range of the dock.

At 1314, the method may further include transmitting at least one signal from the selected communication interface of the dock.

In some embodiments, the dock 900 and/or other embodiments of the communication device 106 may transmit at least one signal that may be received by the antenna 206 (FIG. 2) of the proximity payment device 102 and used to charge a battery and/or the power source 116. For example, the proximity payment device 102 may include circuitry to rectify the received signal to generate DC power that may be used to charge the battery and/or other power source 116. In some embodiments, the at least one signal may be transmitted via the antenna 406 (FIG. 4) and may be similar to an interrogation signal of the above-mentioned "PayPass" standard.

In some embodiments, the dock 900 and/or other embodiments of the communication device 106 may transmit at least one signal that may be received by devices that are not proximity payment device and may be used to charge a battery and/or the power source 116 in such devices.

The dock 900 may have any configuration.

Figure 14A:
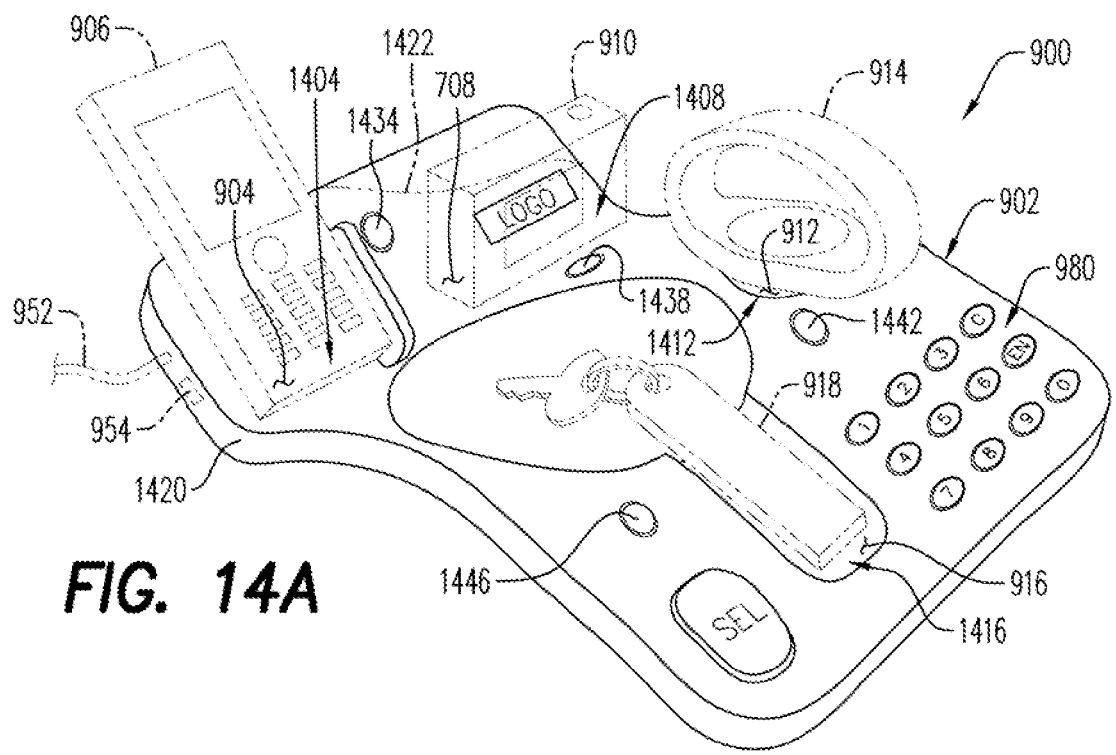
FIG. 14A is a perspective view of a communication device and a plurality of devices thereon, according to some embodiments.
Figure 14B:
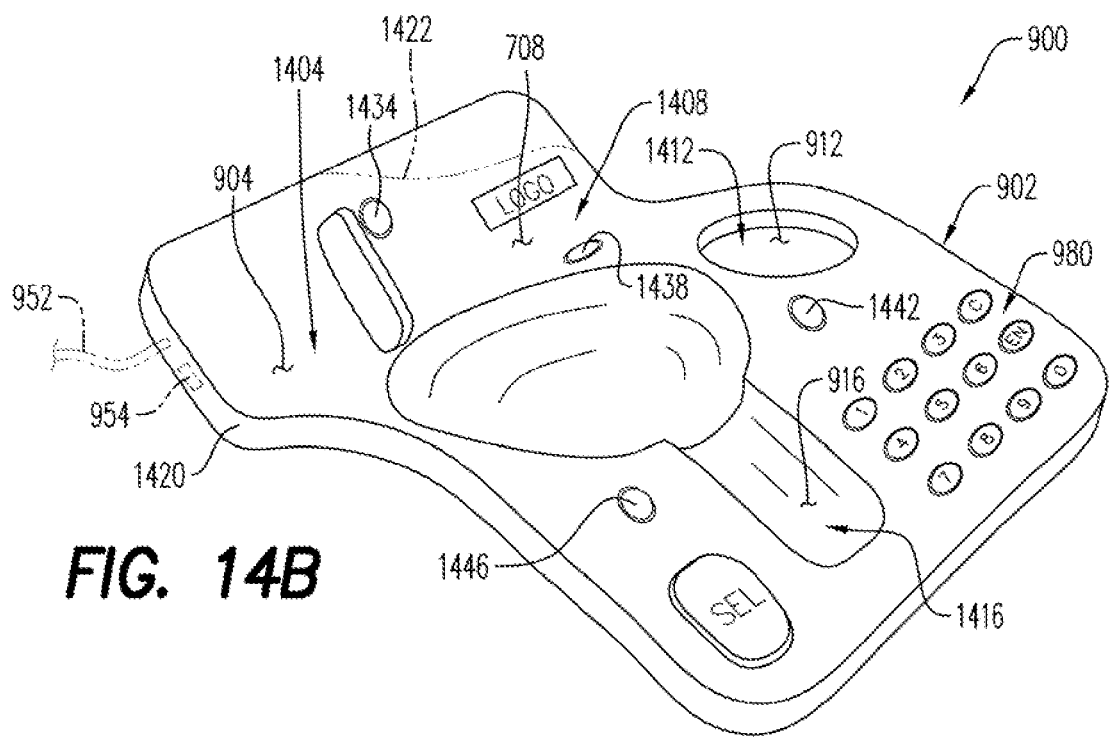
FIG. 14B is a perspective view of a communication device, according to some embodiments.

FIGS. 14A-14B are perspective views of the dock 900 with and without devices thereon, in accordance with some embodiments. Referring to FIGS. 14A-14B, in accordance with some embodiments, the body 902 of the dock may comprise a rigid material. The first seat 904 may be defined by a first recess 1404 shaped to receive the first device 906, the second seat 908 may be defined by a second recess 1408 shaped to receive the second device 910, the third seat 912 may be defined by a third recess 1412 shaped to receive the third device 914, the fourth seat 916 may be defined by a fourth recess 1416 shaped to receive the fourth device 918.

In some embodiments, the first device 906 may comprise a cell phone, the second device 910 may comprise a digital camera, the third device 914 may comprise a wristwatch and the fourth device 918 may comprise a key fob, a key ring and keys. However, other embodiments may also be employed.

In some embodiments, at least one of the first, second, third and fourth recesses 1404, 1408, 1412, 1416 may be shaped so as to help position a respective one of the first, second, third and fourth devices 906, 910, 914, 918 in a way that helps to maximize the strength of the wireless communication between the wireless communication interface in the device and the respective wireless communication interface of the dock 900.

In some embodiments, the antenna for the wireless communication interface of the first device may be disposed adjacent to a lower rear portion the first device. The antenna for the wireless interface of the second device may be disposed adjacent to a bottom of the second device. The antenna for the wireless interface of the third device may be disposed adjacent to a crystal and/or face of the third device. The antenna for the wireless communication of the fourth device may be disposed in the key fob.

Thus, in some embodiments, the recess 1404 to receive the first device 906 may be shaped to receive the lower rear portion of the first device 906 and to position the lower rear portion of the first device 906 flush against the portion of the body 902 that supports the respective wireless communication interface 926 of the dock 900. The recess 1408 to receive the second device may be shaped to receive the bottom portion of the second device 910 and to position the bottom portion of the second device 910 flush against the portion of the body 902 that supports the respective wireless communication interface 930 of the dock 900. The recess 1412 to receive the third device 914 may be shaped to receive the crystal and/or face of the third device 914 and to position the crystal and/or face of the third device 914 flush against the portion of the body 902 that supports the respective wireless communication interface 934 of the dock 900. The recess 1416 to receive the fourth device 918 may position the key fob of the fourth device 918 flush against the portion of the body 902 that supports the respective wireless communication interface 938 of the dock 900. Thus, recess to receive the fourth device 918 may include a first portion and a second portion. The first portion may have an elongated shape to receive an elongated portion of the key fob. The second portion may have a circular and/or spherical shape to receive the key ring and the keys so as not to interfere with positioning of the key fob.

In some embodiments, at least one of the first, second, third and fourth recesses 1404, 1408, 1412, 1416 is further shaped so as to help position a respective one of the first, second, third and fourth devices 906, 910, 914, 918 in a way that helps to provide convenient access to an account holder using the dock 900.

In that regard, in some embodiments, the body 902 may include an angled portion 1420 that defines at least a portion of the first recess 1404. One or more portions of the angled portion may be tapered 1422.

In some embodiments, the body 902 defines an enclosure to enclose, or at least substantially enclose, some or all components of the dock 900. In some other embodiments, the body 902 does not define an enclosure to enclose, or at least substantially enclose, some or all components of the dock 900. For example, the underside of the dock 900 may be open and/or open at least in part.

Figure 15:
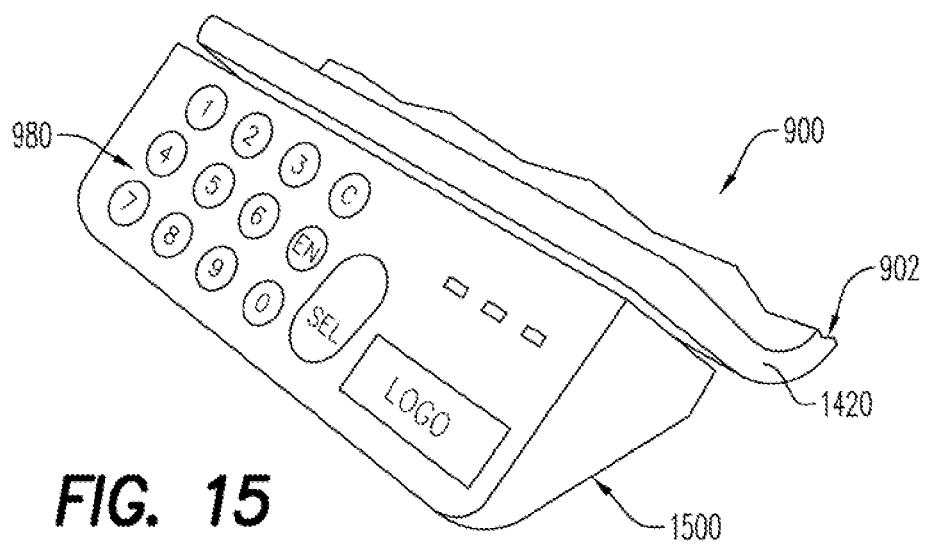
FIG. 15 is a perspective view of a portion of a communication device, according to some embodiments.

The dock 900 may further include a user interface. In some embodiments, such user interface includes the keypad 980. In some embodiments, the keypad is supported by the body 902 of the dock 900. In some other embodiments, the keypad is supported by a body 1500 (FIG. 15) separate from the body 902 of the dock 900.

The keypad 980 may define a plurality of keys. If the keypad 980 is supported by the body 902 of the dock 900, the body 902 may define one or more openings to receive the plurality of keys.

In some embodiments, the user interface includes a plurality of other devices. In some embodiments, such plurality of other devices may include a first input/output device 1434, a second input/output device 1438, a third input output device 1442 and a fourth input/output device 1446. Each input/output device may be associated with a respective one of the first, second, third and fourth devices 906, 910, 914, 918 and may comprise a push button and/or an indicator. If the input/output device includes a push button, the button may be depressable to indicate a desire to select the associated device. If the input/output device includes an indicator, the indicator may indicate that the associated device has been selected and/or that the associated device is in use.

Figure 16A:
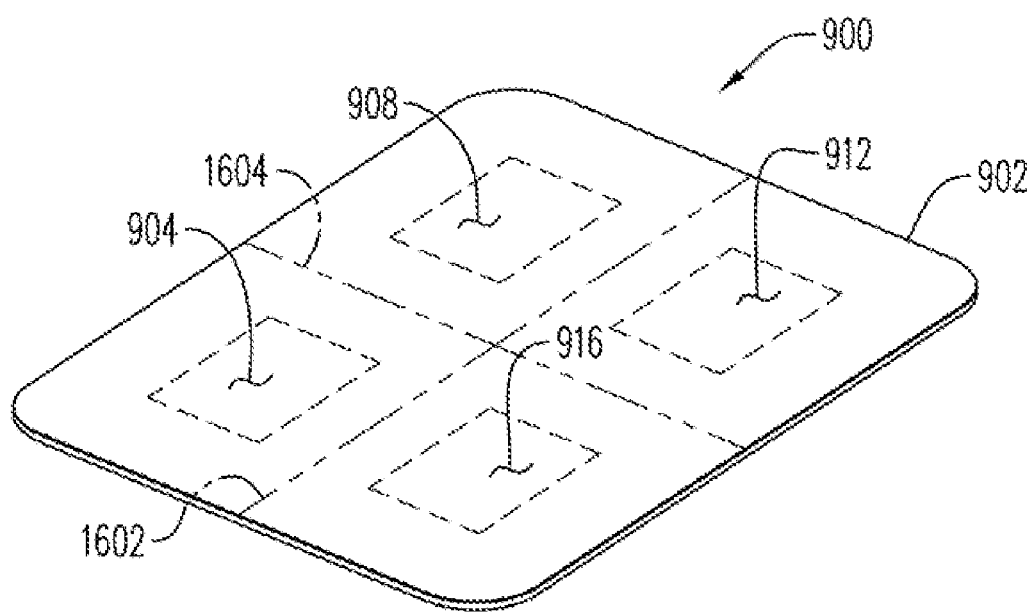
FIG. 16A is a perspective view of a communication device in a first state, according to some embodiments, in a first state.

FIG. 16A is a perspective view of the dock 900 in a first state, in accordance with some embodiments. Referring to FIG. 16A, in accordance with some embodiments, the body 902 of the dock may comprise a flexible material. In some embodiments, the body of the dock comprises a flexible pad. In some embodiments, the body 902 comprises a foldable material. Such a design may facilitate storage and/or transportation of the dock 900.

If desired, the body 902 may then be unfolded so as to allow the first, second, third and/or fourth devices 906, 910, 914, 918 to be positioned on a respective one of the first, second, third and fourth seats 904, 908, 912, 916.

Figure 16B:
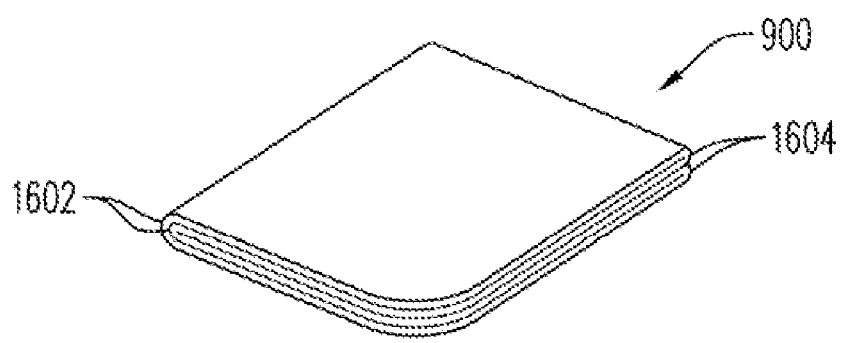
FIG. 16B is a perspective view of the communication device of FIG. 16A in a second state, according to some embodiments.

FIG. 16B is a perspective view of the dock 900 of FIG. 16A in a folded state, in accordance with some embodiments. Referring to FIG. 16B, according to some embodiments, the body 902 of the dock 900 may be foldable along one or more fold lines, e.g., 1602, 1604.

In some embodiments, at least one indicia is provided on the dock 900 and/or other communication device 106 to indicate the position of at least one antenna 406 (FIG. 4) of at least one wireless interface 405 (FIG. 4) of the dock 900 and/or other communication device 106. In some embodiments, each of the at least one indicia is associated with a respective wireless interface of the dock 900 and/or other communication device 106. In some embodiments, each of the at least one indicia comprises indicia that is the same as and/or similar to indicia used in the above-mentioned "PayPass" standard. In some embodiments, each of the at least one indicia comprises a line (solid or broken) that indicates the location of the antenna 406 (FIG. 4) of the associated wireless interface 405 (FIG. 4). In some embodiments, in addition or in lieu thereof, each of the at least one indicia comprises text with instructions such as for example, "PLACE DEVICE HERE".

In some embodiments, indicia is provided on the proximity payment device 102 and/or one or more of devices 906, 910, 914, 918 to indicate the position of an antenna 206 (FIG. 2) of a wireless interface 205 (FIG. 2) of the proximity payment device 102 and/or one or more of devices 906, 910, 914, 918. In some embodiments, the indicia comprises indicia that is the same as and/or similar to indicia used in the above-mentioned "PayPass" standard. In some embodiments, the indicia comprises a line (solid or broken) that indicates the location of the antenna 206 (FIG. 2) of the wireless interface 205 (FIG. 2). In some embodiments, in addition or in lieu thereof, the indicia comprises text with instructions such as for example, "PLACE READER HERE".

Figure 17:
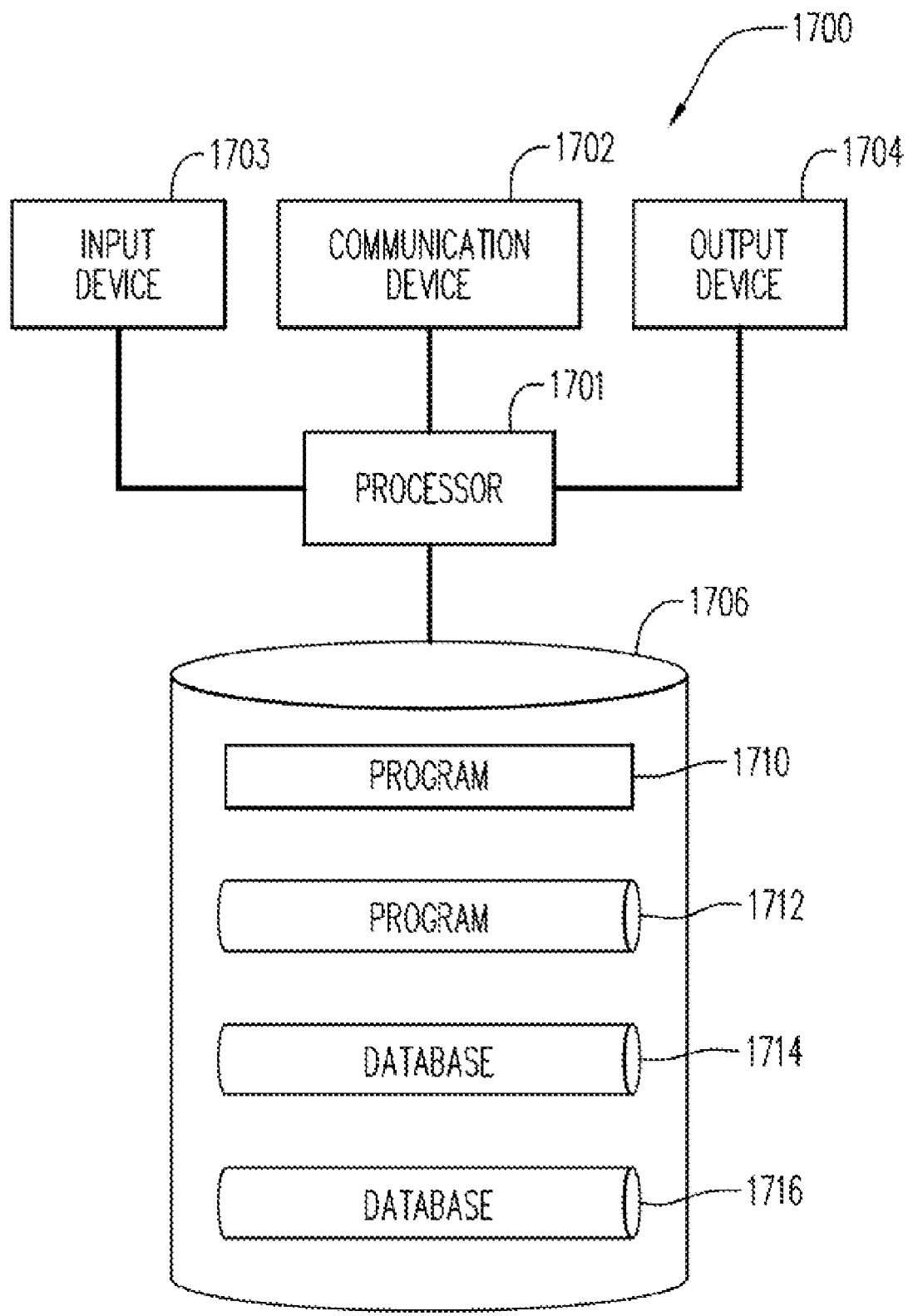
FIG. 17 is a schematic block diagram of an apparatus, according to some embodiments.

FIG. 17 is a block diagram of an apparatus 1700 according to some embodiments. In some embodiments, one or more of the devices (or portion(s) thereof) disclosed herein may have an architecture that is the same as and/or similar to one or more portions of the architecture of apparatus 1700.

Referring to FIG. 17, in accordance with some embodiments, the apparatus 1700 includes a processor 1701 operatively coupled to a communication device 1702, an input device 1703, an output device 1704 and a storage device 1706.

In some embodiments, the processor 1701 may execute processor-executable program code to provide one or more portions of the one or more functions disclosed herein and/or to carry out one or more portions of one or more embodiments of one or more methods disclosed herein. In some embodiments, the processor 1701 may be a conventional microprocessor or microprocessors.

The communication device 1702 may be used to facilitate communication with other devices and/or systems. In some embodiments, communication device 1702 may be configured with hardware suitable to physically interface with one or more external devices and/or network connections. For example, communication device 1702 may comprise an Ethernet connection to a local area network through which apparatus 1700 may receive and transmit information over the Internet and/or one or more other network(s).

The input device 1703 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1704 may comprise, for example, one or more devices used to output data and/or other information, such as, for example: an IR port, a dock, a display, a speaker, and/or a printer, etc.

The storage device 1706 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1706 may store one or more programs 1710-1712, which may include one or more instructions to be executed by the processor 1701.

In some embodiments, the one or more programs may include one or more operating systems, database management systems, other applications, other information files, etc., for operation of the apparatus 1700.

The storage device 1706 may store one or more databases 1714-1716 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or a storage medium readable by a processing system.

As used herein, a signal may be any type of signal, i.e., a physical quantity (e.g., voltage, current, or magnetic field strength), an indication, a message and/or any other type of signal or combination thereof. A voltage, current, or magnetic field strength may be analog, digital, single ended signal, differential and/or any other type or combination thereof.

A wireless communication interface may be any type of wireless communication interface.

As used herein, a controller may be any type of controller. For example, a controller may be programmable or non programmable, general purpose or special purpose, dedicated or non dedicated, distributed or non distributed, shared or not shared, and/or any combination thereof. If the controller has two or more distributed portions, the two or more portions may communicate with one another through a communication link. A controller may include, for example, but is not limited to, hardware, software, firmware, hardwired circuits and/or any combination thereof.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

As used herein, the term "proximity payment device" refers to any device, of any shape, which transmits to a point of sale terminal, by wireless transmission, a payment account number. As used herein, a payment account number may be numeric, non numeric and/or a combination thereof.

In some embodiments, a proximity payment device may also have a contact interface like that of a conventional smart card that includes a contact interface.

In some embodiments, one or more logos and/or brands, including for example the brand/logo of a national and/or international payment card association such as MasterCard International Incorporated, may be provided on one or more surfaces of a proximity payment device. The brand/logo of the issuer may also be provided, as well as, for example, a specific card product brand. Embossed or non-embossed numbers and/or letters may be provided on the proximity payment device to indicate one or more account numbers and/or a name of an account holder. Other features that may be provided on the proximity payment device are an adhesive paper strip to receive the signature of the cardholder, and a security code or the like printed on the adhesive strip. In addition, the proximity payment device may have one or more magnetic stripes to allow the proximity payment device to be read by a magnetic card reader.

Some of the principles taught herein have been described in the context of an EMV risk parameter and/or resetting an EMV risk parameter. However, these teachings are also applicable to any type of security parameter and/or resetting any type of security parameter.

In addition, some of the principles taught herein have heretofore been described in the context of proximity payment devices. Nevertheless, these teachings are also applicable to any type of identification token. As used herein, the term "identification token" refers to a device, having a card shape or any other shape, that serves as one or more of a proximity payment device; a transportation related device; an identification device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

Thus, unless stated otherwise, "an account holder" may include, but is not limited to, any person and/or entity having access to an identification token and/or any accounts associated therewith.

As used herein, an account number may be numeric, non numeric and/or a combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   transmitting at least one signal, via a wireless interface, from an identification token issued to an account holder to a communication device issued to the account holder, the communication device forwarding data from the at least one signal to a remote party for determining a status of the identification token;

receiving, by the identification token, at least a second signal from the communication device via the wireless interface before the identification token becomes unusable, the at least second signal including an authorization to reset a security parameter in the identification token and received by the communication device from the remote party in response to the forwarding of the at least one signal; and resetting, before the identification token becomes unusable, the security parameter in the identification token in response at least in part to receiving the at least second signal from the communication device.

2. The method of claim 1 wherein the security parameter comprises a security parameter based at least in part on:
   a number of transactions that have been made using the identification token; and
   an amount that has been spent using the identification token.

3. The method of claim 1 wherein the at least one signal transmitted from the identification token comprises at least one of:
   an account number; and
   a name of a person.

4. The method of claim 1 wherein the identification token comprises an identification token supported by a body of at least one of a cell phone, a wristwatch, a portable data assistant, a music player and a key fob.

5. The method of claim 1 wherein the communication device comprises a cellular telephone.

6. The method of claim 1 wherein the remote party is at least one of the following:
   an issuer of the identification token; and
   a party associated with an issuer of the identification token.

7. The method of claim 6 further comprising receiving a response signal from at least one of the following:
   the issuer of the identification token; and
   the party associated with the issuer of the identification token.

8. The method of claim 7 wherein forwarding data from the at least one signal to a remote party for determining a status of the identification token comprises:
   forwarding data from the at least one signal to a remote party using at least one of the following:
   a telephone line; and
   a computer network.

9. The method of claim 1 wherein the communication device comprises a first communication device and the method further comprises:
   transmitting at least one signal from the first communication device to a second communication device issued to the account holder.

10. The method of claim 9 wherein the first communication device comprises a dock and the second communication device comprises a cellular telephone issued to the account holder.

11. The method of claim 1 further comprising disabling use of the identification token if the security parameter does not satisfy a criteria.

12. The method of claim 1 wherein the security parameter comprises an EMV risk parameter.

13. Apparatus for use in association with a communication device issued to an account holder, the apparatus comprising:
   an identification token issued to an account holder separate from the communication device, the identification token to transmit at least one signal, via a wireless interface, to the communication device issued to the account holder for forwarding data from the at least one signal to a remote party for determining a status of the identification token, to receive at least a second signal that includes an authorization to reset a security parameter in the identification token from the communication device via the wireless interface before the identification token becomes unusable, the at least second signal received by the communication device from the remote party in response to the forwarding of the at least one signal, and to reset the security parameter in the identification token before the identification token becomes unusable in response at least in part to receiving the at least second signal from the communication device.

14. The apparatus of claim 13 wherein the security parameter comprises a security parameter based at least in part on:
   a number of transactions that have been made using the identification token; and
   an amount that has been spent using the identification token.

15. The apparatus of claim 13 wherein the at least one signal transmitted from the identification token comprises at least one of:
   an account number; and
   a name of a person.

16. The apparatus of claim 13 wherein the identification token comprises an identification token supported by a body of at least one of a cell phone, a wristwatch, a portable data assistant, a music player and a key fob.

17. The apparatus of claim 13 wherein the communication device comprises a cellular telephone.

18. The apparatus of claim 13 wherein the security parameter comprises an EMV risk parameter.

19. The apparatus of claim 13 wherein the security parameter comprises a security parameter based at least in part on a number of times that the identification token has been used.

* * * * *